W. BAIRD.
DRIVING GEAR FOR MOTOR VEHICLES.
APPLICATION FILED OCT. 24, 1908.
968,521.
Patented Aug. 30, 1910.
5 SHEETS—SHEET 1.
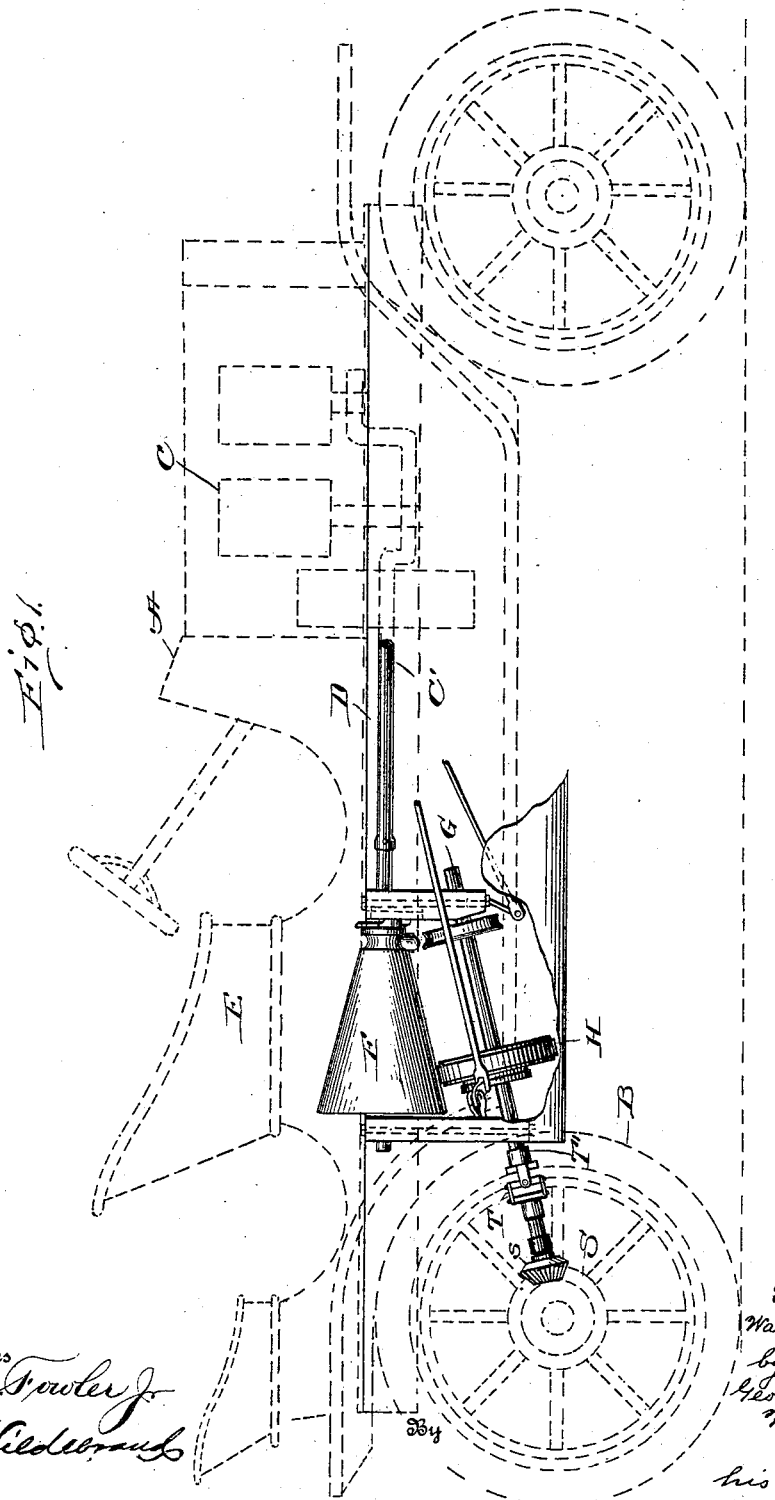

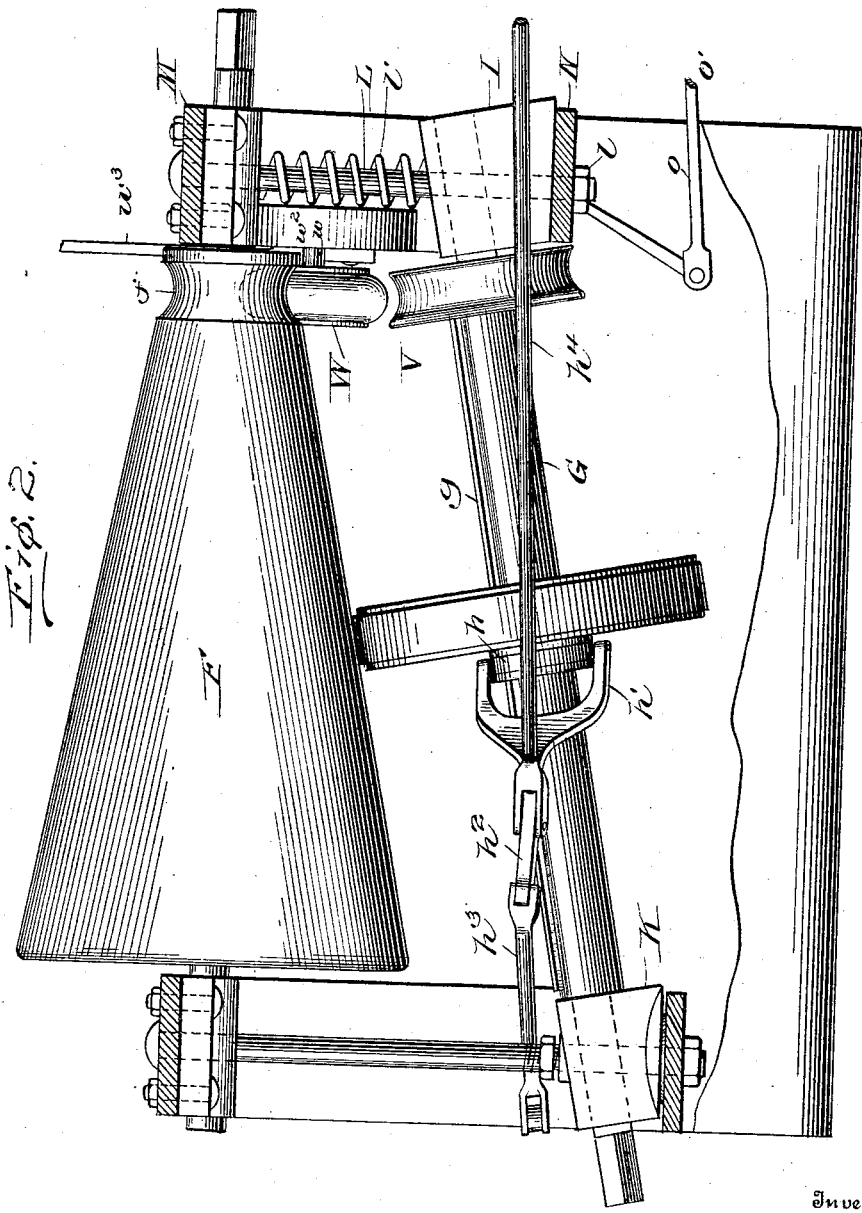

W. BAIRD.
DRIVING GEAR FOR MOTOR VEHICLES.
APPLICATION FILED OCT. 24, 1908.
968,521.
Patented Aug. 30, 1910.
5 SHEETS—SHEET 3.
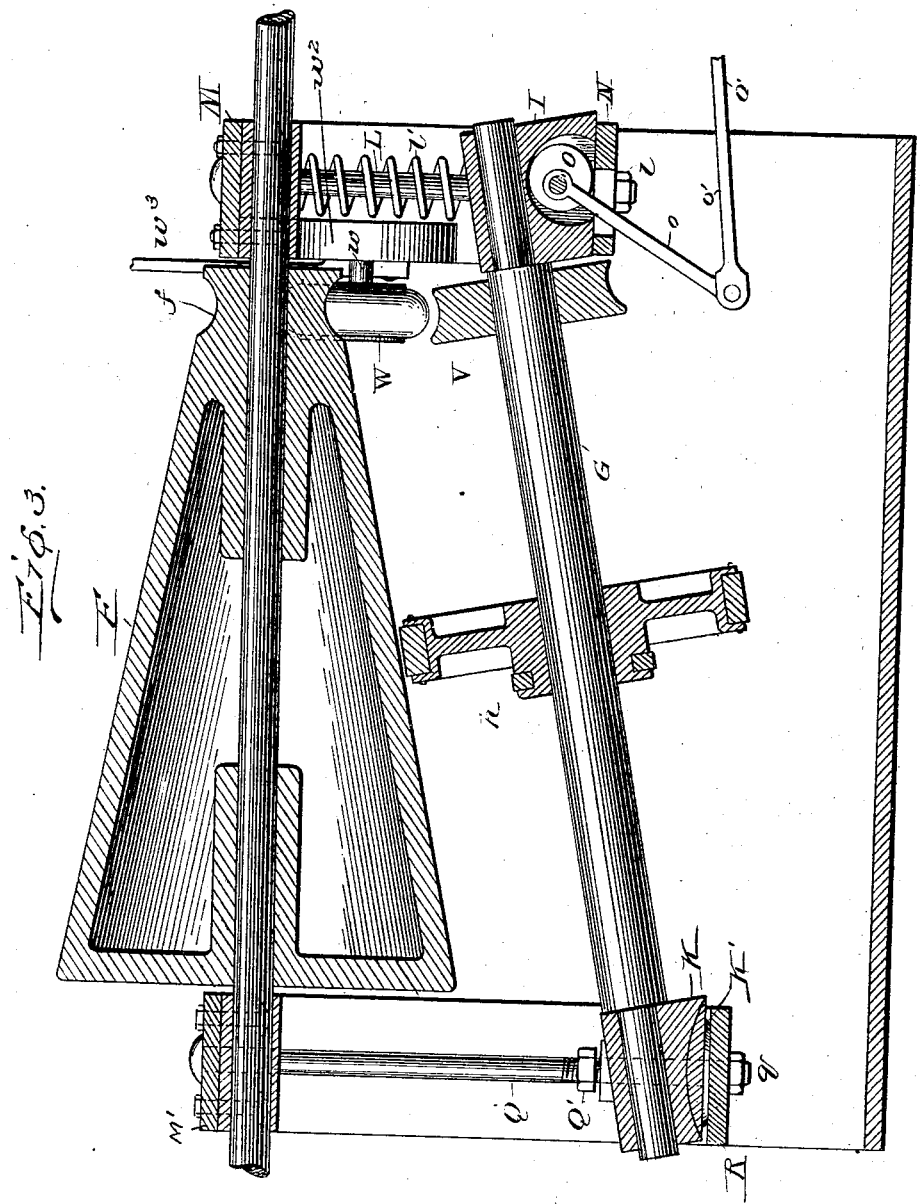
Witnesses
Inventor
Walter Baird
By Georgii V. Massie
his Attorneys W. BAIRD.
DRIVING GEAR FOR MOTOR VEHICLES.
APPLICATION FILED OCT. 24, 1908.
968,521.
Patented Aug. 30, 1910.
5 SHEETS—SHEET 4.
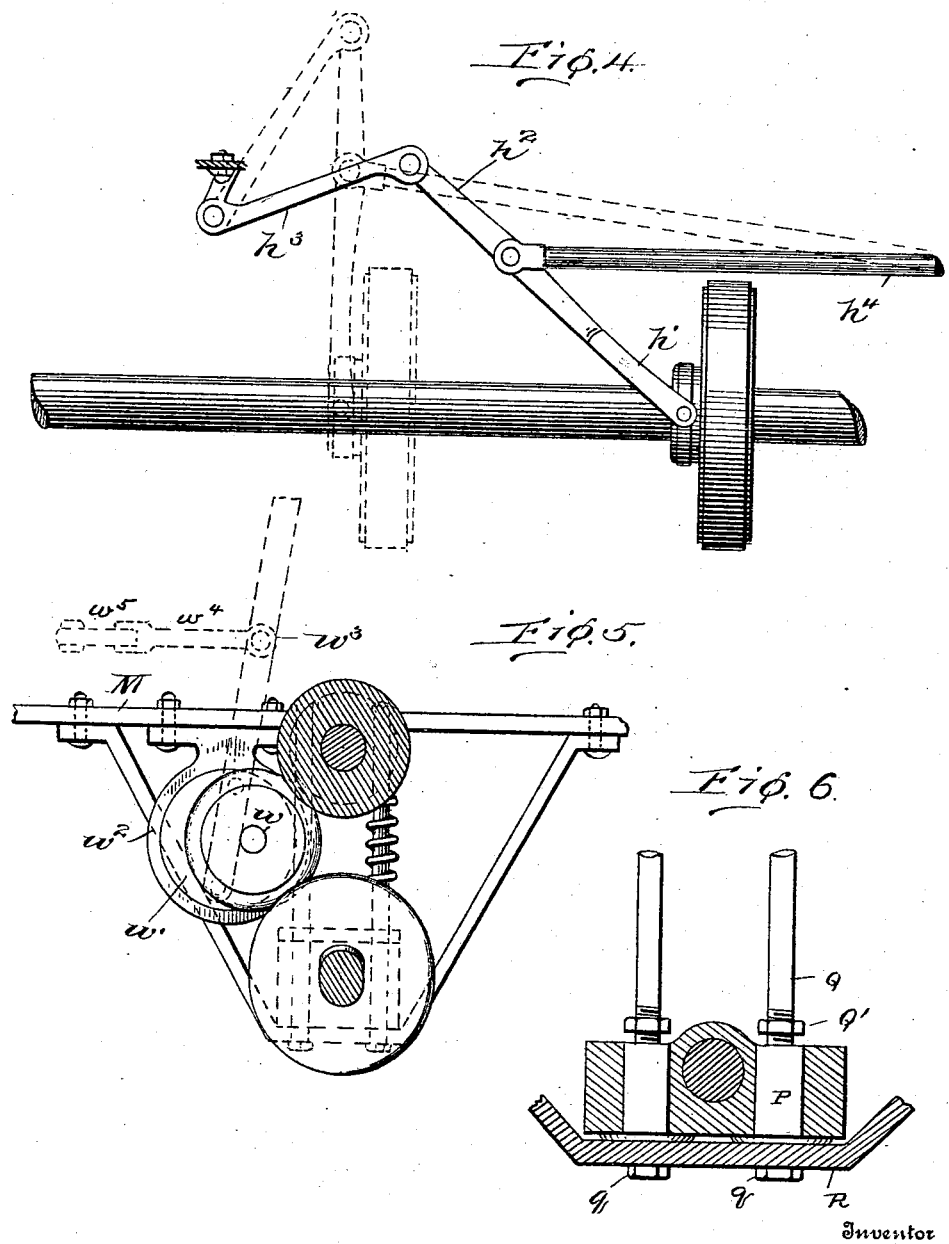
Witnesses
J. M. Fowler
E. O. Hildebrand
Inventor
Walter Baird
By Georgii & Massie
his Attorneys W. BAIRD.
DRIVING GEAR FOR MOTOR VEHICLES.
APPLICATION FILED OCT. 24, 1908.
968,521.
Patented Aug. 30, 1910.
5 SHEETS—SHEET 5.
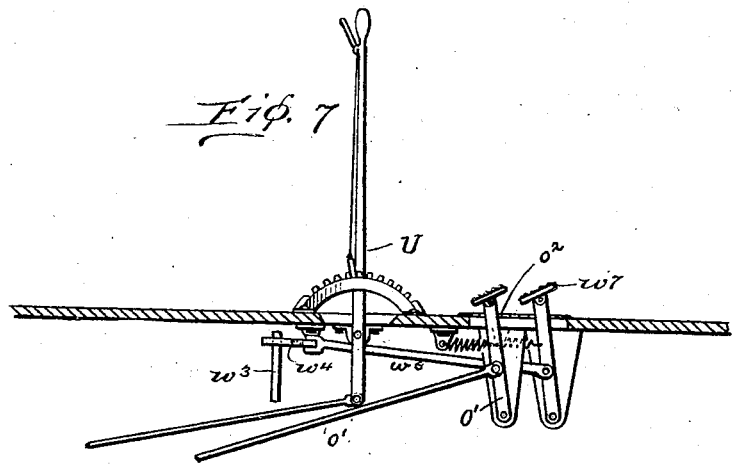
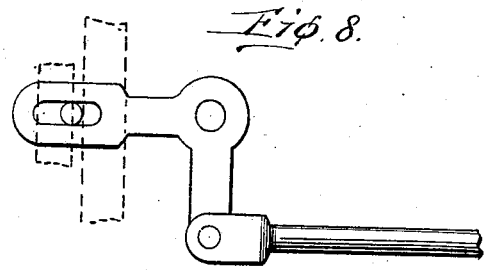
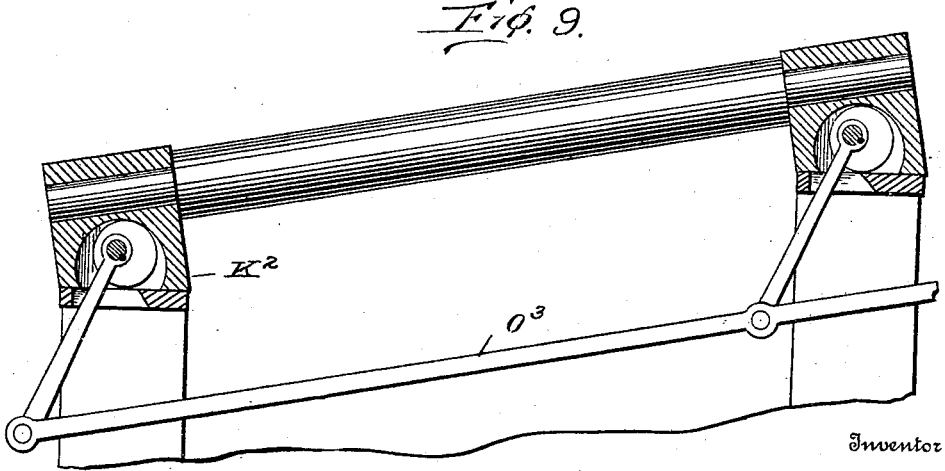

UNITED STATES PATENT OFFICE.

WALTER BAIRD, OF PITTSBURG, KANSAS.

DRIVING-GEAR FOR MOTOR-VEHICLES.

968,521. Specification of Letters Patent. Patented Aug. 30, 1910.

Application filed October 24, 1908. Serial No. 459,419.

*To all whom it may concern:*

Be it known that I, WALTER BAIRD, citizen of the United States, residing at Pittsburg, county of Crawford, Kansas, have invented certain new and useful Improvements in Driving-Gears for Motor-Vehicles; and I do hereby declare the following to be a full, clear, and exact description of the invention, such as will enable others skilled in the art to which it appertains to make and use the same.

My invention relates to automobiles, and has particular reference to certain improvements whereby a friction transmission gearing of adequate size may be successfully employed in such vehicles.

Within recent years it has been recognized that variable speed transmission devices of a frictional type have special advantages when used in automobiles, notwithstanding the inherent serious disadvantage of a considerable loss of power due to the slip of the frictional surfaces upon each other. Many attempts have been made to overcome this loss of power but without any appreciable success, principally for the reason that such attempts led to complications which themselves caused a loss of power, and, furthermore, removed one very important advantage of the frictional device, namely, simplicity.

Up to the present time the disk type of variable speed friction transmitter has been the one which has been put into actual practice in automobiles, so far as I am informed. The friction disk transmitter comprises two disks whose axes are at right angles to each other, the periphery of one disk touching the side face of the other disk. Owing, however, to the necessity of having the axes of the two disks at right angles, the use of such transmission devices compels the use of additional gearing, chains, and the like, in order to transmit the power from the driven member of the transmission in the proper direction toward the rear axle, or else results in a loss of clearance under the vehicle.

Attempts have been made heretofore to employ variable speed frictional transmitters comprising a conical drum and a friction roller in contact therewith, but up to the present time such conical drum devices have not been put into actual use, so far as I am informed, because the construction and arrangement of parts was such as to make it difficult if not practically impossible to use a conical drum of sufficient size in the restricted space of the usual automobile, and also because in most such arrangements various complications are introduced which themselves consume power.

The object of my invention is to provide a variable speed frictional transmission device which will reduce the loss of power to a minimum for frictional transmitters, which will be free from the disadvantages of the devices hitherto known, and which will permit the employment of large frictional members in the restricted space of the usual automobile.

With this general object in view and some others which will be clear to those skilled in the art from the description hereinafter set forth, my invention consists in the features, details of construction, and combination of parts which will first be described in connection with the accompanying drawings and then particularly pointed out in the claims.

In the drawings: Figure 1 is a side elevation, with a part of the casing removed, of a variable speed frictional transmission device embodying my invention, indicating the manner in which the same is arranged in an automobile; Fig. 2 a side elevation, on an enlarged scale, of the transmission mechanism; Fig. 3 a longitudinal sectional view, partly in elevation, of said transmission mechanism; Fig. 4 a detail plan view illustrating the mechanism for shifting the friction roller; Fig. 5 a transverse section of the transmission device, showing the reversing mechanism; and Figs. 6, 7, 8, and 9 detail views hereinafter referred to.

Referring to the drawings, and in particular to Fig. 1, A is a vehicle having rear driving wheels, one of which is indicated at B.

At C is indicated the usual engine, occupying the place usual for such engines in an automobile, the engine shaft C' extending parallel to the top of the chassis and just below the top stringer D of the same and being journaled in suitable bearings secured to the said stringer or some other convenient fixed part.

Upon the rear portion of the engine shaft, and beneath the front seat E of the vehicle, is fixed a conical friction drum F of suitable material such as any of the so-called friction metals common upon the market.

Below the friction drum F is arranged a driven shaft G upon which is mounted a friction roller H, which has a periphery composed of suitable friction material such as, for example, fiber or compressed paper.

The friction roller H is splined to the shaft G so as to permit it to be shifted axially along the shaft, and yet to compel the rotation of said shaft when the friction roller is rotated. In the present example, the shaft is shown as provided with a feather or spline $g$, Fig. 2, while the friction roller H has a slot coacting with said spline.

The driven shaft G, is so arranged that when the friction roller H is in close contact with the lower edge of the conical drum, the axis of said shaft is parallel to the lower or under edge of the conical drum, that is to say, the line of contact between the roller and drum will always be parallel to the axis of the driven shaft.

Suitable means are provided for moving the driven shaft away from and toward the drum in order to bring the friction roller into and out of contact with said driven shaft. This means may be such as will move the driven shaft so as to retain it always parallel, or such as to move it out of parallelism, that is to say, to swing it away from the conical drum.

In Figs. 2 and 3 I have illustrated one embodiment of the latter type, in which that part of the driven shaft G which carries the friction roller H is mounted in bearings, I, K, the front one I being capable of vertical movement, while the other, K, is arranged to rock or move about an axis transverse to the said driven shaft. The said bearings are carried by pendent frames comprising suspender rods and upper and lower cross bars.

In the example referred to, the bearing I is provided with vertical slots through which pass suspender rods L, the upper ends of which are held by a suitable transverse bar M, constituting part of the framework, while the lower ends of said rods L project through a transverse bar N and are provided with nuts $l$.

Upon the two rods are mounted helical springs $l'$ which rest against the upper surface of the journal box I, and thereby tend to push said box downward. Beneath the said box I is arranged a suitable device for forcing said box upward, as for example, an eccentric, O, Fig. 3, provided with an arm $o$ which is connected by a rod $o'$, to a foot-lever O', Fig. 7, fulcrumed on the vehicle body convenient to the front seat, so that when the said lever O' is moved toward the front it will rotate the eccentric, O, and lift the journal box I. The foot lever O' is locked in the position to which it may be adjusted by a suitable locking means, consisting in this instance of a segmental ratchet $o^2$ engaged by a pawl mounted on the foot lever and laterally projecting from the foot-lever, in the usual way, so that when the operator releases the lever the journal box I will be depressed by the action of the springs $l'$.

The journal box K has a concave under surface, which rests upon a bearing plate K', Fig. 3, having its upper surface convex. The journal box and bearing plate are provided with slots into which enter sleeves P having heads at their lower ends to support the bearing plate, K', said sleeve being threaded upon the lower portions of suspender rods Q, which are held at the upper ends by a cross-bar M'. Just above the sleeves P the said rods Q are provided with checknuts Q', which are larger in diameter than the sleeves and thereby serve to limit the upward movement of the journal box and its bearing plate.

The lower ends of the rod Q pass through a cross-bar R and are provided with nuts $q$. When the eccentric is moved to lift the front bearing I, as hereinbefore described, the journal box K rocks about its concave surface over the convex surface of its bearing plate K', the adjustment of the bearings I and K being such that when the friction roller H makes proper contact with the lower surface of the conical drum F the driven shaft G is parallel to the lower edge of the conical drum. This parallelism of the said shaft and the lower edge of the drum may be maintained, notwithstanding any wear of the periphery of the friction roller H, by adjusting the journal box K toward the drum by screwing the sleeves P farther up on their suspender rods Q, the nuts Q' being also screwed farther up on said rods, so as not to contact with the upper surface of the said box K, the slight freedom of movement upward allowed to said journal box being for the purpose of permitting a slight angular movement of said journal box when the driven shaft is swung downward away from the drum.

In the construction indicated in Fig. 9, the driven shaft G is arranged to stay in parallelism with the lower edge of the conical drum, both when the friction roller H is in contact with the drum and also when it is out of contact. In this construction the rear bearing, indicated at $K^2$, is the same as the front bearing, that is to say, it is lifted upward by an eccentric just as is the front bearing. The two eccentrics are connected by the operating rod $O^3$ as shown.

The usual differential gear for the rear axle is indicated at S, Fig. 1, and the driven shaft is provided with a bevel gear wheel $s$, which engages and drives the said differential gear in the well known way. The driven shaft is provided, intermediate the rear axle and the friction roller H, with a flexible connection consisting, in the present example, of the usual universal joint T and a slip joint T', comprising merely a squared tenon and a socket having a squared opening into which the tenon fits loosely. The slip joint T' compensates for horizontal variations and the universal joint for angular variations in the relative positions of the two parts of the shaft G. It will be seen that the flexible connection of the shaft serves to permit the free play of the vehicle body up and down in the usual manner, and in addition permits the movement of the front portion of the driven shaft when the friction roller H is swung toward and from the conical drum.

For the purpose of shifting the friction roller H along the driven shaft, I have provided the roller with a peripherally grooved hub, in which is placed a loosely fitting ring $h$, Fig. 3, having pins on which is fulcrumed the fork $h'$, Fig. 2, of a lever $h^2$, whose outer end is hinged to a link $h^3$ fulcrumed on a suitable part of the frame, as shown in Fig. 4. To the forked lever $h'$ is pivoted a shift-rod $h^4$ having its front end connected to the lower end of a hand lever U fulcrumed near the front seat and arranged to be locked by the ordinary segmental rack and hand-operated pawl. By moving the hand lever U back and forward the friction roller may be adjusted to the desired position.

For the purpose of permitting the direction of travel of the vehicle to be reversed, I have provided the smaller front end of the cone with a peripheral groove, indicated at $f$, Fig. 2, and beneath this a friction roller V, is fixed upon the shaft G, this roller having a grooved periphery. At one side of the drum is mounted an idler roller W, Figs. 2 and 5, having its periphery rounded in cross section to fit into the corresponding grooves in the conical drum and friction roller V. The idler roller is mounted on a stud, $w$, carried by an eccentric $w'$ journaled in a bearing $w^2$, supported on the cross-bar M, the eccentric being provided with an arm $w^3$ by which it may be rotated to move the idler roller W into or out of engagement with the drum and the roller V.

The arm $w^3$ may be operated from a point near the front seat by any suitable means. In the present example, I have shown the arm $w^3$ connected by a link $w^4$ to one arm of a bell crank $w^5$, pivoted on a suitable part of the frame-work of the machine, the other arm of the said bell crank being connected by a rod $w^6$ to a foot lever, $w^7$, which is arranged at a convenient place in the front part of the vehicle.

It will be clear that by my construction the engine shaft may be kept in a substantially horizontal position and thus can be arranged out of sight and out of the way beneath the floor of the vehicle, while at the same time the strains on the engine are less objectionable than when it is at an angle. Moreover, the conical drum and the roller may be made large so that the pressure necessary to transmit by friction the power of a powerful automobile engine may be kept within reasonable limits, this being possible because the conical drum is above the roller and extends upward into the space beneath the front seat. By reason of its location and arrangement, the conical drum may be long enough to give a wide range of speed variation while its slope is suitable to allow the driven shaft to be parallel to the under surface of the cone, so that the friction roller may always make a proper contact with the drum surface, while at the same time having the proper slope to reach the differential gear of the rear axle without any sharp changes of direction. Furthermore, by arranging the friction roller beneath the conical drum, a part of the pressure necessary to keep the friction roller and drum in contact is employed in lifting or rather tending to lift the conical drum and its shaft, or in other words, the bearings of the driving shaft are relieved of so much of the upward pressure of the friction roller as is neutralized by the downward pressure due to the weight of the conical drum and its shaft, thus materially relieving said bearings. In addition, the very important further advantage is attained that the flexible connection which is necessary in all automobiles between the source of power and the rear axle to compensate for the vertical and slight horizontal movement of the vehicle bed relative to the axle, due to the use of springs, also serves to permit the movement of the friction roller and its shaft toward and from the conical drum, the said flexible connection thereby performing two functions.

Inasmuch as the engine and its shaft are disposed horizontally, the wear on the pistons, cylinders and bearings of the same will be distributed equally on all sides of the contacting parts instead of being all on one side as occurs when the engine and the driving shaft are placed at an angle. Furthermore, by arranging the conical drum with its smaller end toward the engine, the driven shaft is brought into such a position that it will lie above the horizontal plane of the axles and thereby give a maximum clearance to the vehicle while its weight will assist in holding the pinion in mesh with the gear on the rear axle.

By the construction shown I limit the points at which a loss of power can occur to four bearings and the point of frictional contact of the friction roller H and conical drum F, thereby reducing the losses to the minimum which can be obtained for a frictional transmission device, while at the same time so simplifying the apparatus as to reduce the cost of maintenance to a minimum.

Having thus fully described my invention, what I claim is:

1. The combination, with a vehicle, an engine mounted on the vehicle, and an engine shaft, of a conical drum mounted on the engine shaft at the rear of the engine and having its smaller end nearest the engine, a friction roller arranged to contact with the under side of said conical drum, a driven shaft on which said friction roller is mounted, said driven shaft being parallel with the under side of the conical drum when the friction roller and drum are in contact, mechanism for transmitting power from the said driven shaft to the rear wheel of the vehicle, means for shifting the friction roller along the driven shaft, and means for bringing the friction roller and the drum into contact with each other.

2. The combination, with a vehicle, an engine mounted on the vehicle, and an engine shaft, of a conical drum mounted on the engine shaft at the rear of the engine and having its smaller end nearest the engine, a friction roller arranged to contact with the under side of said conical drum, a driven shaft on which said friction roller is mounted, said driven shaft being parallel with the under side of the conical drum when the friction roller and drum are in contact, mechanism for transmitting power from the said driven shaft to the rear wheel of the vehicle, means for shifting the friction roller along the driven shaft, and means for moving the driven shaft toward and from the drum.

3. The combination, with a vehicle, an engine carried by the vehicle, and a horizontal engine shaft, of a conical drum mounted on said engine shaft, said drum having one side sloping downward and toward the rear of the vehicle, a friction roller arranged to contact with the said sloping side of the drum, a driven shaft upon which said friction roller is splined, means intermediate the driven shaft and the rear wheels of the vehicle whereby the latter are driven, means for shifting the friction roller along the driven shaft, means for moving the driven shaft toward and from the conical drum, a second friction roller fixed on the driven shaft, an eccentric mounted at one side of the drum and the said second friction roller, an idler carried by said eccentric, and means for rotating said eccentric and thereby forcing the idler into contact with both the drum and the said roller.

4. The combination, with a vehicle, having a seat, an engine mounted upon the vehicle body in front of said seat, and a conical drum extending into the space beneath said seat and having its smaller end nearest the engine, of means intermediate the engine and drum for driving the drum, a friction roller in contact with the under surface of the conical drum, a driven shaft on which said friction roller is splined, means for shifting said friction roller along said driven shaft, means for moving said shaft toward and from said drum, means for driving the rear wheels of the vehicle from said driven shaft, and a flexible connection in said driven shaft between the friction roller and the means for driving the rear wheels.

5. In an automobile, the combination, with the automobile body, of a driving shaft, bearings carried by the body for said shaft, a conical drum mounted on said shaft, a driven shaft beneath said drum, bearings in which the driven shaft is mounted, suspended rods depending from the bearings for the driving shaft, adjustable supports for the driven shaft arranged on the lower ends of the suspender rods, means for moving the driven shaft toward and from the conical drum, a friction roller splined to the driven shaft and arranged to contact with the drum, and means for moving the said friction roller along the said shaft.

6. In an automobile, the combination, with the automobile body, of a driving shaft mounted thereon, a conical drum mounted on said shaft, a driven shaft below said drum, a friction roller on said driven shaft and arranged to contact with the under surface of the drum, means for moving said friction roller along said driven shaft, movable bearings for said shaft, an eccentric device disposed below said bearings and acting on the under side of the same to move the shaft toward and from the drum, the eccentric being disposed to move longitudinally with respect to the shaft, and means for operating said eccentric device.

In testimony whereof I hereunto affix my signature in the presence of two witnesses.

WALTER BAIRD.

Witnesses:
  M. C. MASSIE,
  EDWIN O. HILDEBRAND.